US005607730A

United States Patent [19]

Ranalli

[11] Patent Number: 5,607,730

[45] Date of Patent: Mar. 4, 1997

[54] METHOD AND APPARATUS FOR LASER COATING

[75] Inventor: Ronald J. Ranalli, Caledonia, Mich.

[73] Assignee: Clover Industries, Inc., St. Clair Shores, Mich.

[21] Appl. No.: 662,570

[22] Filed: Jun. 13, 1996

Related U.S. Application Data

[63] Continuation of Ser. No. 526,651, Sep. 11, 1995, abandoned.

[51] Int. Cl.$^6$ .................... C08J 7/04

[52] U.S. Cl. .................... 427/512; 118/68; 118/406; 118/419; 427/185; 427/189; 427/596

[58] Field of Search .................... 427/512, 596, 427/189, 185; 118/68, 406, 419

[56] References Cited

U.S. PATENT DOCUMENTS

| | | | |
|---|---|---|---|
| 3,743,777 | 7/1973 | Hanus et al. | 219/121 |
| 3,873,339 | 3/1975 | Hudson | 117/17 |
| 3,974,303 | 8/1976 | Iwase et al. | 427/27 |
| 4,554,025 | 11/1985 | Burke et al. | 134/17 |
| 4,615,903 | 10/1986 | Miller | 427/26 |
| 4,627,197 | 12/1986 | Klee et al. | 51/319 |
| 4,631,732 | 12/1986 | Christensen | 372/87 |
| 4,671,848 | 6/1987 | Miller et al. | 156/643 |
| 4,988,538 | 1/1991 | Horvel et al. | 427/53.1 |
| 5,044,129 | 9/1991 | Olevitch | 51/322 |
| 5,091,034 | 2/1992 | Hubert | 156/344 |
| 5,143,533 | 9/1992 | Brusasco | 65/18.1 |
| 5,200,230 | 4/1993 | Poullos et al. | 427/8 |

OTHER PUBLICATIONS

"Hardware and Process Techniques For The Application And Cure of Paints, Adhesives, And Other Coatings Utilizing Lasers As The Mechanism For Curing" (No date avail.).

*Primary Examiner*—Bernard Pianalto
*Attorney, Agent, or Firm*—Dykema Gossett PLLC

[57] ABSTRACT

A novel method of applying paints and other coatings is disclosed which can be carried out by forcibly inserting a cloud of coating particles carried by at least one inert gas into a laser beam attenuated by defocusing. At least one of the inert gases serves as a shield against combustion and can be directed downwardly in addition to a sideway spreading and spraying action. The pressure of the inert gas pushes the particles down onto the substrate. As soon as the particles are energized by the laser beam, they melt and begin to flow while at that exact instant, the coating particles come into contact with the substrate to avoid any possible dissipation of the laser energy. The coating material compositions can be altered by increasing the melting time of the particles even though a short melting time is preferred for achieving a fast coating process.

52 Claims, 2 Drawing Sheets

METHOD AND APPARATUS FOR LASER COATING

This application is a continuation of application(s) Ser. No. 08/526,651 filed on Sep. 11, 1995, abandoned.

FIELD OF THE INVENTION

The present invention generally relates to a method and apparatus for laser coating and more particularly, relates to a method and apparatus for laser coating by inserting a cloud of coating particles into a laser beam attenuated by defocusing onto a substrate wherein as soon as the coating particles are energized by the laser beam the particles melt and begin to flow.

BACKGROUND OF THE INVENTION

In typical applications of liquid or powdered coatings, problems encountered include the use of volatile organic contaminants to suspend the coating solids, the overspray and the necessity of masking to assure accurate coverage, and the use of large amount of thermal energy in curing. These problems are costly in terms of pollution abatement, high labor content, and high energy consumption. The abatement of volatile organic contaminants is strictly controlled by the EPA in terms of pollution control and possible exposure to toxins. Strict adherence to EPA guidelines by the manufacturers is both costly and time consuming.

The accurate control of coating coverage is frequently difficult and requires extensive masking even in more advanced coating techniques such as the electrostatic coating. The application and removal of masking is time consuming and labor intensive. Another poor use of time and energy is the necessity of curing a coating in a hot air oven.

In an effort to overcome the drawbacks encountered in conventional coating techniques, coating methods by using laser have been developed in recent years. These techniques normally utilize laser for curing an already applied coating on a substrate. The laser energy is used very inefficiently since the exact location of the laser beam and its energy distribution are not taken into consideration. For instances in curing a coating having a high melting point, the curing point is set at or near the focus point of the laser in order to achieve a high power density. In curing a coating having lower power requirements, the laser beam is defocused which makes the thermal transfer less efficient. The only available process control is to increase the power level in order to overcome any curing problems.

The presently available laser curing techniques do not utilize gas flows to carry a coaxial flow from a lens to a substrate. Some laser techniques require the operation to be conducted in sealed atmospheric chambers which is not a practical approach for high volume productions. For instance, one existing method of laser curing of powder coating applies a thin layer of powders on a substrate first and then irradiates a laser beam over the powders. Since the laser beam causes the powders to draw together, several successive layers of powders must be applied and the laser beam must be used to pass over the coating several times. This makes a continuous process or a process capable of accurate thickness control very difficult. In coating high temperature powders such as those containing metal particles or refractory materials, a laser beam first forms a molten pool of the substrate and then powder is sprayed directly onto the molten area. As a result, the substrate material is frequently damaged by the intense heat.

Other laser coating techniques involve the use of powder coatings that contain special laser light absorbers mixed into the powder in order to increase the absorption of laser energy. This is only necessary because of the inefficient use of laser energy in conventional laser coating techniques, where most of the energy is wasted. Still other conventional laser coating techniques involve the use of high energy densities and relatively low coating speeds. Powders are applied either electrostatically or simply sprayed on with poor repeatability. A slow laser scanning speed is necessary in order to ensure that all the powder is melted in one pass. The powder can also be indirectly heated from below by the heat transferred from the substrate. It is therefore not possible, using a conventional laser curing technique, to coat plastic substrates except at slow speeds and at small powder thicknesses. Since the laser is applied to the powders inefficiently, an excessive amount of heat must be generated in order to carry out a conventional laser coating technique.

It is therefore an object of the present invention to provide a method and apparatus for using a laser in coatings that do not have the shortcomings and the drawbacks of the prior art laser coating methods.

It is another object of the present invention to provide a method and apparatus for using a laser in coatings that do not require the processing step of first applying a layer of powder on a substrate prior to the application of laser energy.

It is a further object of the present invention to provide a method and apparatus for using a laser in coatings in which a coating powder is first energized with laser energy before it is applied and fused to a substrate.

It is yet another object of the present invention to provide a method and apparatus for using a laser in coatings by forcibly inserting a cloud of coating particles into a laser beam attenuated by defocusing.

It is still another object of the present invention to provide a method and apparatus for using a laser in coatings by first providing an inert gas to form a cloud of coating particles suspended in the gas in such a way that the inert gas serves as a shield against combustion.

It is another further object of the present invention to provide a method and apparatus for using a laser in coatings by first providing an inert gas to form a cloud of coating particles suspended in the gas and energized by a laser beam such that the coating particles can be directed downwardly toward a substrate in addition to the sideway spreading of the particles.

It is still another further object of the present invention to provide a method and apparatus for using a laser in coatings wherein coating particles suspended in an inert gas begin to melt and flow as soon as the particles are energized by a laser beam.

It is yet another further object of the present invention to provide a method and apparatus for using a laser in coatings wherein coating particles suspended in an inert gas begin to melt and flow as soon as they are energized by a laser beam such that the particles adhere to a substrate instantly.

SUMMARY OF THE INVENTION

The present invention provides a method and apparatus for applying paints or other coatings by using an exact amount of heat sufficient to flow and cure the coating without damaging the coating material or the substrate. The benefits made possible by the present invention are the reduction or the elimination of volatile organic contaminants, the instantaneous heating and cooling of the coatings which eliminates the need for energy-wasting cure ovens or lengthy air drying, and the ability to accurately spray the coatings in a defined area without over-spraying.

The present invention novel method of applying paints or other coatings can be carried out by forcibly inserting a cloud of coating particles carried by at least one inert gas into a laser beam attenuated by defocusing. One inert gas serves as a shield against combustion and can be directed downwardly in addition to a sideway spreading and spraying action. The pressure of the inert gas pushes the particles down onto the substrate. As soon as the particles are energized by the laser beam, they melt and begin to flow while at this exact instant, the coating particles come into contact with a substrate, avoiding any dissipation of laser energy. The coating material compositions can be altered by increasing the melting time of the particles even though a short melting time is preferred for achieving a fast coating process.

The present invention apparatus is designed to assure an even distribution of paint particles at a predetermined point in the distribution of the laser beam after the focal point. In the apparatus, inert gas is used to prevent the oxidation and combustion of by-products. The inert gas is used to carry the paint particles, to shield the nozzle/ bell-shaped housing area, and to force the particles down onto a substrate and away from the lens area. The coating is applied by forming the coating particles into a cloud and then forcing them, by molar quantities of the compressed inert gas, into an attenuated laser beam. The inert gas assists in the spreading out of the particles in a spray pattern that covers the entire cross-sectional area of the attenuated beam. As soon as the coating particles absorb the laser energy, the particles begin to flow and instantaneously cure. The coating is formed on the substrate from successive layers of droplets. The inert gas serves two important functions in the present invention. First, it provides direction to the coating particles such that once they begin to melt and flow they are moved toward the substrate and are deposited and cured on the surface of the substrate. Secondly, the inert gas allows subsequent coating particles to enter the space in the laser beam vacated by the first batch of particles such that successive layers of particles can be melted and deposited on top of each other.

The present invention apparatus utilizes a laser that has a wavelength of about 9.8 micrometer in order to enhance absorption at the particle level. This wavelength is considered by those skilled in the art as an unusual and disfavored wavelength for laser applications. It was uniquely discovered that the specific wavelength provides additional absorption and enables substantial process improvement. The process improvement can be further enhanced by incorporating metallic components in the coating powders. The laser source utilized in the present invention can be a $CO_2$, a CO, a NdYAG or an ion laser. The type of laser selected is matched to the absorption characteristics of the coating material used. A circular polarization is taken place inside the laser cavity which provides additional processing improvement since polarization is more efficient inside the laser cavity then outside. The arrangement also allows more space in the optical train to alter the beam for larger total coverage on a substrate. The laser beam is attenuated, or its power reduced, by specific gas flow rates. The power of the laser beam is reduced by limiting the amount of the $CO_2$ going into the laser cavity. It is especially suitable in processing substrates or powders that have a low melting temperature.

Axicons are used differently in an alternate embodiment of the present invention in that the laser beam is not upcollimated immediately prior to reflection off the axicon. Instead, the beam is sent into a final focusing lens after the axicon where a lens is used as a beam spreader. After the laser beam expands from the lens, it assumes the shape of the axicon. The present invention also allows the use of a series of axicons to shape beams around the complex geometry of a part. The elicons can be positioned on adjustable rails such that several elicons can be used in series.

The coating particles (of either solid or liquid) is distributed in a novel way in the present invention method of laser coating. In order to achieve a uniform particle density, the present invention novel method forms a distribution at a specific angle of between about −5° to about +23° from the normal plane, and spreads a pattern out from about 0.55" at the tip of the nozzle to about 3.65" at the end of a 8" bell-shaped housing. The coating particles are inserted at 90° traverse to the relative motion of the beam. As the beam moves relative to the part, the particles are sprayed out, melted, flowed, and cured along the traversed path. A uniquely used bell-shaped housing conforms both to the shape of the beam from the axicons as well as the shape of the substrate to be coated. It supplies an inert atmosphere at a proximity of the substrate surface and affords a maximum coverage of the spread beam.

BRIEF DESCRIPTION OF THE DRAWINGS

Other objects, feature and advantages of the present invention will become apparent upon consideration of the specification and the appended drawings, in which.

DETAILED DESCRIPTION OF THE PREFERRED EMBODIMENT

The present invention provides a method and apparatus for laser coating by inserting a cloud of coating particles into a laser beam attenuated by defocusing onto a substrate wherein as soon as the coating particles are energized by the laser beam the particles melt and begin to flow.

Figure 1:
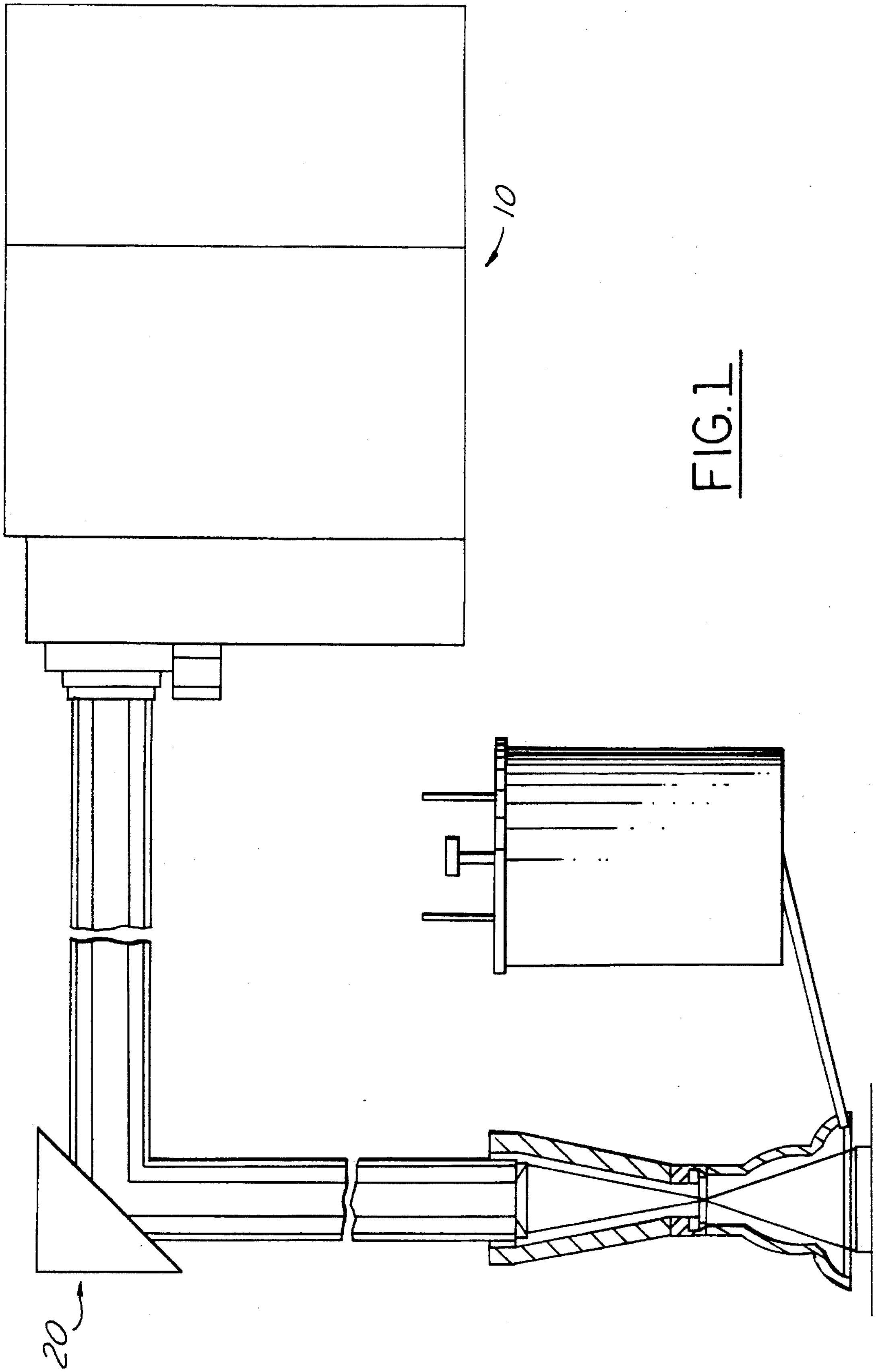
FIG. 1 is a perspective view of the present invention laser coating apparatus.

Referring initially to FIG. 1, wherein a laser source 10 as shown can be selected from a $CO_2$, a CO, a NdYAG, or an ion laser. The preferred source is a $CO_2$ laser operated in a continuous-wave mode. An important consideration of the present invention is the alternate means of attenuation that can be used. $CO_2$ lasers emit lased photons at four distinct wavelength lines. A specific wavelength in the range between about 9.5 to about 10.5 micrometer, and preferrably about 9.8 micrometers is selected for use in the present invention. It allows for the greatest absorption of the photons by metallic elements in the powder coating compositions. While the selected wavelength is not critical for most applications, it is an important consideration in the preferred embodiment of the present invention.

It has been observed that the ability to absorb photons is enhanced by as much as 10% when the wavelength of the laser is increased. This advantage is important when metal particles are incorporated into paint powders used in the preferred embodiment. The preferred laser equipment is a 2,000 watt continuous-wave $CO_2$ laser such as that manufactured by PRC Corporation of Landing, N.J. It is preferred that the laser be circularly polarized with low optical divergence. The circular polarization should take place inside the laser cavity. The gas mixing control should be designed to allow for attenuation by the modification of the gas mixture.

It was discovered that in order to realize the full benefit of the gas mixing procedure, gas should be mixed in a composition of $CO_2$: 5.0~15.0 cfm, $N_2O_2$: 45 cfm, and He: 75~80 cfm. The low limit of 5.0 cfm of $CO_2$ is just enough to sustain lasing power and is useful when the coating material is very absorptive or has a low cure temperature.

In practice, the laser is tuned into a TEMOO mode to allow for an even distribution of the laser energy through a down-line axicon. The laser should be equipped with power conditioning in the power supply and should be grounded against electromagnetic interference. The internal optics used are standard equipment such as those supplied by II–VI Corporation of Saxonburg, Pa. The laser equipment is preferrably mounted on a frame that is connected to the workpiece. Vibration isolation of the laser equipment is achieved by the mass of the frame and therefore does not require isolation damping devices.

In an alternate embodiment, an axicon or a series of axicons (not shown) can be used as a special optical device that modifies the shape and the energy distribution of the laser beam. It can be acquired commercially from sources such as PCX Corporation of San Jose, Calif. In a standard configuration, the purpose of the axicon is to refract the photons from a laser beam just before they reach the part. The axicon component is normally used as a final optical device. However, it is not used for such purpose in the present invention coating applications. In normal usage, an axicon is used with an upcollimating device (not shown) to take a beam from its normal 0.75" to 0.80" diameter and collimate, and then to refract them back to a parallel condition of a predetermined larger diameter. This wider beam diameter is usually determined by the size of the part to be processed.

In the alternate embodiment, an axicon (not shown) is set immediately after the final, partially reflective mirror of the laser. It is important to place the axicon prior to the occurrence of the pre-focus condition for lasers. For $CO_2$ lasers this occurs at approximately. 3 meters and for NdYAG lasers, this occurs at approximately 6 inches. The ideal location for the axicon was discovered to be at 6.3" for $CO_2$ lasers, and at 2.2" for NdYAG lasers. In the alternate embodiment, no upcollimators are used with the axicon. Expansion of the laser beam takes place at the final focusing lens. By the special placement of the axicon, pre-focus conditions occur after the beam has been shaped by the axicon. The shaped beam spreads out further and therefore can more efficiently use the surface area of the final focusing lens to spread the beam out even further in its defocused condition. The axicon can be water cooled, both in $CO_2$ and in NdYAG types of lasers. This minimizes spherical aberration and increases the usable lifetime of the axicon. The axicon can further be rail mounted for ease of adjustment and for positioning several axicons in series.

Isolation tubes (not shown) for the laser equipment can also be used in the present invention apparatus to ensure the performance and to eliminate process variations due to optical train contamination. Black oxide treated tubes which telescope inside each other via teflon seals are isolated from the outside contaminants by bleed in lines of not more than 2 psi over atmosphere of oil-free instrument air or bottled $N_2$. The fixed isolating tubes are also mechanically isolated by tying directly through structural mounting into the frame of the system. The tubes are threaded directly into all optical train hardware to ensure rigidity throughout the system.

Another important component of the laser coating system is the bending mirror 20. All bending mirrors must be water cooled, low phase shifted and isolated. The mirrors are commercially available from II–VI Corporation of Saxonburg, Pa. The low phase shift feature of the mirrors is essential due to the fact that significant phase shift impairs the coherence and produces fringing and interference with the power distribution down-line in the optical train. The bending mirrors should be isolated from mechanical vibration as well as from deleterious effects of heat. Chilled water at a temperature of 64° F. is used when the room temperature is less than 80° F. and the relative humidity is less than 82%. The bending mirror 20 is mounted in a corner mount that flows water across the backplane of the mirror at a rate of 0.1 GPM. The water flow should be continuous since the mass of the corner mount cannot be used as a heat sink.

The precision movement of the final focusing lens 46, relative to the position of the substrate to be coated, must be controlled through a servo driven "Z" axis. The servo motion is required because the transition between different heights on a part must be made without excessive dwell times and with smooth motions. Offset distances for the proper placement of the beam must also be exact. The "Z" axis is set up to run with two collapsing tubes (not shown) where one tube is set inside the other by keeping out unwanted air via a teflon ring. The first tube is set into the mirror mounting block (not shown) with a fine pitch thread and bottoms out in the base of the mirror. It has a inner diameter of 2" and extends down 13". The interior tube is 12" in length with a ¾" wide mounting strip. The mounting strip (not shown) is attached to an arm fixed to a servo drive. A positioning stage (not shown) such as that manufactured by Schneeberger of Lexington, Mass. and driven by a precision motor (not shown) such as that manufactured by the Parker-Hannifin Corporation of Dayton, Ohio drives the focusing head up and down relative to the position of the workpiece. In order to maximize the smoothness of travel, a counter weight (not shown) is attached to the backside of the "Z" axis stage. This allows the motor to drive only the relative mass of the stage in a flat condition rather than constantly working against the mass of the stage due to the force of gravity.

Figure 2:
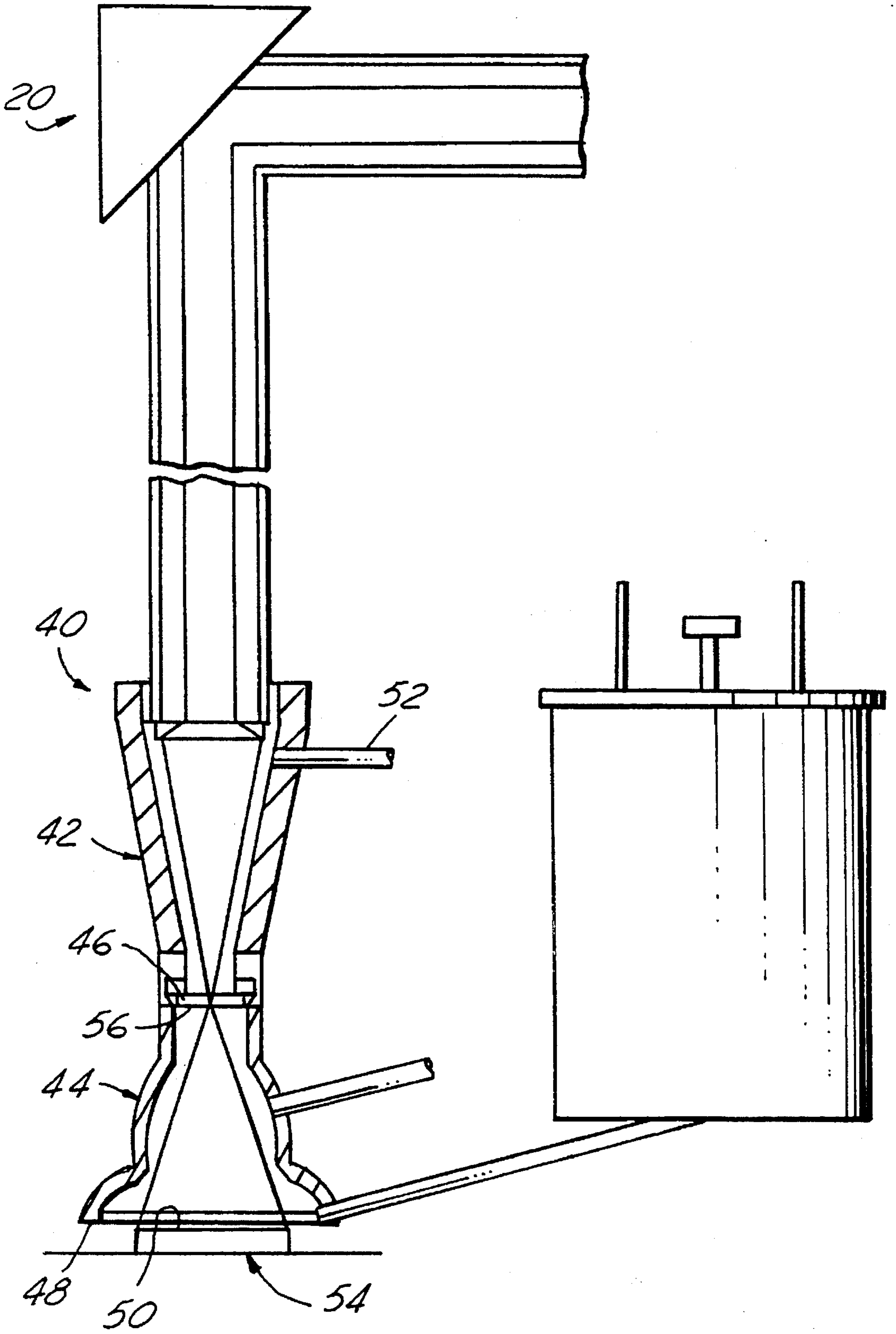
FIG. 2 is an enlarged cross-sectional view of the powder distribution system and the application of the nozzle/ bell-shaped housing.

An enlarged cross-sectional view of a coating applicator 40 is shown in FIG. 2. The applicator 40 is comprised of an upper nozzle section 42 and a lower bell-shaped section 44. The nozzle section 42 is designed to take the laser beam, which may be shaped by the axicon in the alternate embodiment, from a nominal diameter of 0.95" from the entrance point of the beam to the face of the final focusing lens 46 to a spread of up to three feet for a 2000 watt $CO_2$ laser. The final focusing lens 46 is used as a final beam spreader, much as an upcollimator is intended to spread the beam in a controlled manner to take advantage of the beam for focusing purposes. In the preferred embodiment for coating applications, the uniform spreading capabilities of the laser lenses are utilized for the present invention. The preferred lens is a 5.0" effective focal length lens that has a best form (asphere) lens surface. A best form lens is used to minimize spherical aberration in order to prevent beams from fringing and interfering with each other down the focal plane.

The bell-shaped section 44 of the applicator 40 generally conforms to the shape of the beam as set by the axicon. Even though the preferred embodiment is a bell-shaped housing, the general rules for construction of a coating nozzle are that:

1. The distance of the lip 48 of the bell-shaped housing 44 to the surface 50 of the part 54 to be coated varies from a minimal 0.25" to a maximum of 0.625", even though a distance of up to 1" may also work.

2. The gas used to push the particles down to the surface 50 of the substrate 54 is preferably inert but should be at least oil-free. The flow rate should be from 0.1 to 0.35 cfm at 12 to 20 psi pressure. The gas should be introduced below the final focusing lens 46 at an angle of between 20° and 47.5° from the horizontal plane, and at a distance of 0.5 to 0.75" below the bottom plane 56 of the final focusing lens 46.
3. The bell-shaped housing 44 should be shaped from an opening of 3" to conform to the laser tip mounting to an end of 6" in diameter, and 4.5" from the final focusing point of the lens 46. For instance, at an hourglass configuration point, no less than 4.5" below the focus point of the 5.0" lens.
4. The centerline of the orifice of the spray tip for the introduction of the coating particles is located 0.345" to 0.375" above the lower rim 48 of the bell-shaped housing 44. The particles are introduced at angles varying from 7.5° to 18° relative to the top surface 50 of the substrate 54 to be coated.

The novel coating apparatus may further include a multi-axis motion system (not shown) which is an ultra-fast, no-backlash, extremely precise, multi-axis motion system in order to properly coat the substrate. The system controller must be powerful enough to control mechanical motions, adjust laser and media feeding parameters, and direct axicon performance in real time. The ideal configuration is a rotary axis that has a 360° turning, capability and can speed up to 2,000 rpm, a tilt-axis that has a 270° turning capability and a speed of 1,000 rpm, and an "X" linear axis that has a travel of 48" and a traverse speed of 15" per second, a "Y" linear axis that has a travel of 36" and a traverse speed of 15" per second, a "Z" linear axis that has a travel of 24" and a traverse speed of 5" per second. Accuracy of the described circular axis should be ±0.5%. The repeatability of the described circular axis should be ±0.5%. The accuracy of the described linear axis should be ±0.005", except for the "Z" axis which should be ±0.001". The repeatability of the described linear axis should be 0.0005" per inch of travel. The straightness of the described linear axis should be ±0.001". The perpendicularity of the described X and Y axis should be ±0.005". The orthagonality of the X, Y, and Z axis should be ±0.001". The speed accuracy of the described circular axis at rated loads should be ±1%. The accuracy of the described linear axis at the rated loads should be ±0.5%.

The present invention novel coating system can powder coat or liquid coat substrates with an instantaneous cure rate over most flat, contoured or shaped surfaces. The process is dependent upon an even energy distribution which is absorbed by the powder or liquid paint particles. The latent heat or cure energy of the photons is rapidly disbursed into the coating particles and not into the substrate. Since it is desirable that the particles be painted in successive layers, melting ideally takes place in the train of light before striking the substrate.

The following are some practical examples utilizing the present invention novel method and apparatus.

In a typical process, a chilled water supply to the laser equipment is first turned on in order to operate the laser equipment at a temperature between 45° to 50° F. If the chiller temperature is running below 45° F., water will condense on some moisture sensitive components of the system. On a cool day, the system can be run safely at 33° F. For warmer days, the system should not run below 41° F.

The laser fill gas stored in a tank is then turned on. A pressure of at least 200 psi in the gas tank is normally required. For critcal parts, the pressure should not be below 500 psi. The outlet pressure for the tanks should be around 80 psi. The flow of $N_2$ and $CO_2$ are then shut off at the gas control panel while leaving the helium gas running for the warm up period.

At the start of the process, a starting power is set at 1300 watts, an idle power is set at 1250 watts, a maximum power is set at 1350 watts and a minimal power is set at 1250 watts. When the laser is turned on, the vacuum pump first takes the system down to 2 mbar. As soon as the chamber is at 2 mbar, the blower begins to fill the chamber with laser gas until the pressure reaches 25 mbar. The helium pressure should be kept at between 75 and 90 psi during the refill period. Once the laser is warmed up, other laser gases are bled into the system, i.e. nitrogen first at 45 psi and then $CO_2$.

In order to achieve the attenuation control of the laser, a combination of low levels of $CO_2$ and a setting of a suitable power level are used. The lower power level settings can be obtained by reducing the flow of $CO_2$ in the gas control panel for low power requirement, the system can be operated with stability at 5 psi $CO_2$ and 500 watts of power.

EXAMPLE 1

Coil Coating

A cold rolled steel of 0.110" thick is coated in this example. The coil is set on a flat table which has a flatness relative to the end of the nozzle of 0.005". The coil is fixtured to the table so that it can not move during high speed traversing.

The pressure for the $CO_2$ gas is 7.5 psi, for the helium gas is 75 psi, and for the nitrogen gas is 45 psi. The storage tank temperature is kept at 36° C. and the gas blower temperature is kept at 124° C. The refill gas pressure of the gas mixture used to attenuate the beam by changing the $CO_2$ pressure is 33 mbar. The chiller temperature is allowed to go as high as 51° F. in order to modulate the beam to a greater extent resulting in more beam spread and less power density in the center of the beam. The average of the amp setting of the gas flow tube is 145 ma. The power setting is 775 watts. A purged gas is set through the top bleed in tube of the nozzle at 5 psi. The bleed in tube is positioned at 7.8" above the coil. The powder/inert gas flow enters the bell-shaped housing at 0.45" above the coil. The angle of entry is 4° from the horizontal plane of the coil. The powder/inert gas flow is set at a pressure of 30 psi and a flow rate of 40 cfm. Standard grade helium is used as the purge gas.

The powder used is a polyurethane based coating material which is fed into the system at a flow rate of 22.5 grams per minute. The spread from the nozzle is from ¼" to ¾" from the left side to the right side of the nozzle. The speed of the traverse is 25" per minute. The powder flow starts before the table moves while the laser power is applied 0.5 seconds after the table moves. The coil strip width is 0.25" wide.

The lens used has a 5" effective focal length. It has a plano convex configuration. The focal point is set 7" away from zero while the distance of the coil to the face of the lens is 12". The orifice opening used to direct the bleed in powder/inert gas flow is 0.5". The laser is used in a continuous wave mode. The gap from the top of the coil to the bottom of the bell-shaped housing is 0.35". A satisfactory coating is obtained on the coil.

EXAMPLE 2

Sheet Steel Coating

A hot rolled sheet steel having a thickness of 0.41" is coated. The sheet steel is set down on a flat table which has a flatness relative to the end of the nozzle of 0.01". The sheet steel is fixtured to the table so that it does not move during high speed traversing.

The flow pressure for the $CO_2$ gas is 6.5 psi, for the helium gas is 75 psi, and for the nitrogen gas is 45 psi. The high voltage storage tank temperature is 34° C. and the gas blower temperature is 118° C. The refill gas pressure of the gas mixture for attenuating the beam through the manipulation of the $CO_2$ pressure is 31 mbar. The chiller temperature is set at 40° F. and the average amp setting of the gas flow tubes is 138 ma. The power setting is 585 watts.

The purge gas is set through the top bleed in orifice of the nozzle at 7.5 psi. Bleed in is set at 8" above the steel. A side flow enters the left-hand side of the bell-shaped housing with the center of nozzle at 0.5" above the sheet. The angle of entry is 7° from the horizontal plane of the sheet. The side flow is set at 36 psi. A standard grade helium is used as the purge gas.

The powder used is a polyurethane base powder at a flow rate of 35 grams per minute. The spread from the nozzle is from ¼ to ⅔" from the left side to the right side of the nozzle. The speed of the traverse is 20" per minute. The powder flow starts before the table moves while the laser power is applied 0.5 seconds after the table moves.

The lens used has a 5" effective focal length. It has a plano convex configuration and a focal point set at 9" away from zero, i.e. the distance of the coil to the face of the lens is 14". The orifice opening used to direct bleed in flow is 0.5".

The laser used is a $CO_2$ laser in a continuous wave mode. The gap from the top of the steel sheet to the bottom of the bell-shaped housing is 2.35". A satisfactory coating is obtained on the sheet steel.

EXAMPLE 3

Fine Grit Blasted Steel Sheet Coating

A cold rolled steel sheet having 0.025" thickness is coated. The sheet is set down on a flat table having a flatness relative to the end of the nozzle of 0.005". The sheet is fixtured to the table so that it does not move during high speed traversing.

The flow pressure for $CO_2$ is 5 psi, for helium is 75 psi, and for nitrogen is 45 psi. The high voltage tank temperature is 35° C. and the gas blower temperature is 120° C. The refill gas pressure of the gas mixture used to attenuate the beam through the manipulation of the $CO_2$ pressure is 32 mbar. The chiller temperature is set at 40° F. The average amp setting of the gas flow tubes is 140 ma and the power setting is 500 watts.

The purge gas is set through the top bleed in orifice of the nozzle at 5 psi located at 7.8" above the sheet. The side flow is entered at the left-hand side of the bell-shaped housing with the center of the nozzle at 0.45" above the steel sheet. The angle of the entry is +5° to the horizontal plane of the sheet. The side flow pressure is set at 20 psi. Standard grade helium gas is used as the purge gas.

The powder used is a polyurethane powder coating material supplied by the Evtech Company of Charlotte, N.C. under the code name of EVLAST 1000/1B119. The powder has a specific gravity of 1.2 as determined by ASTM D-792. It is a black solid powder having a slight odor. It has an auto-ignition temperature of 452° C. The flow rate of the powder is set at 10 grams per minute. The spread from the nozzle is from ¼" to ¾" from the left side to the right side of the nozzle. The speed of the traverse over the sheet is 25" per minute. The powder flow starts before the table moves. The laser power is applied 0.5 seconds after the table moves.

The lens used has a 5" effective focal length. It has a plano convex configuration. The focal point is set 7" away from zero, i.e., the distance of the sheet to the face of the lens is 12". The orifice opening used to direct bleed in flow is 0.5". The laser mode is continuous wave. The gap from the top of the coil to the bottom of the bell-shaped housing is 0.1". A satisfactory coating is obtained on the steel sheet.

EXAMPLE 4

Door Handle Liquid Painting

Door handles of 0.2" thick made of cast zinc are painted. The flatness of the part relative to the end of the nozzle is 0.005". The handle is fixtured by positioning onto tappered pins that suspend the part 1" over the fixture plate.

The gas flow pressure for the $CO_2$ gas is 5 psi, for the helium gas is 75 psi, and for the nitrogen gas is 45 psi. The high voltage tank temperature is 32° C. and the gas blower temperature is 155° C. The refill gas pressure of the gas mixture for attenuating the beam through the manipulation of the $CO_2$ pressure is 30 mbar. The chiller temperature is set at 40° F. and the average amp settings of the gas flow tubes is 130 ma. The power is set at 510 watts.

The purge gas is set through the top bleed in orifice of the nozzle at 5 psi which is set at 7.8" above the handle. The side flow is entered at the left-hand side of the bell-shaped housing with the center of the nozzle at 0.45" above the handle. The angle of entry is +6" to the horizontal plane of the surface of the handle. The side flow is set at 25 psi. It goes through a liquid pressure pot and exits through a 0.06 or a 0.120" orifice. Standard grade helium gas is used as the purge gas.

The paint material used is a liquid black paint No. 83-1026 supplied by the Guardsman Corporation. The spread from the nozzle is from 0.1" to 0.25". The laser cures the paint as soon as it traverses it. The speed of the traverse is 55" per minute. Liquid paint flow starts as the table moves while the laser power is applied 0.5 seconds after the table moves.

The lens used has a 5" effective focal length. It has a plano convex configuration. The focal point is set at 7" away from zero. The orifice opening used to direct bleed in flow is 0.5". The mode of the laser is continuous wave. The gap from the top of the handle to the bottom of the bell-shaped housing is 0.15". Satisfactory coating of the door handles was obtained.

EXAMPLE 5

Wood Painting

Hardwood pieces of 0.5" thick are coated. The pieces are set down on a flat table wherein the flatness of the table relative to the end of the nozzle is 0.005". The wood is fixtured to the table so that it does not move during high speed traversing.

The gas flow pressure for the $CO_2$ gas is 5 psi, for the helium gas is 75 psi, and for the nitrogen gas is 45 psi. The high voltage tank temperature is kept at 36° C. and the gas blower temperature is kept at 124° C. The refill gas pressure of the gas mixture used to attenuate the beam through the manipulation of the $CO_2$ pressure is 33 mbar. The chiller temperature is 35° F. and the average amperage settings of the glass flow tubes is 135 ma. The power setting for the laser is 500 watts.

The purge gas is set through the top bleed in orifice of the nozzle at 5 psi located at 7.8" . above the wood piece. The side flow is entered at the left-hand side of the bell-shaped housing with the center of the nozzle at 0.45" above the wood piece. The angle of entry is +5° to the horizontal plane of the wood piece. The side flow is set at 40 psi. Standard grade helium gas is used as a purge gas.

The powder material used is supplied by the Evtech Company under the product code of No. F40241. The flow rate of the powder is set at 35 grams per minute. The spread from the nozzle is from ¼" to ¾" from the left side to the right side of the nozzle. The speed of the traverse is 75" per minute. The powder flow starts before the table moves and the laser power is applied 0.5 seconds after the table moves.

The lens used has a 5" effective focal length and a plano convex configuration. The focal point is set 7" away from the zero, i.e., the distance of the wood piece to the face of the lens is 12". The orifice opening used to direct bleed in flow is 0.5". The mode of the $CO_2$ laser is continuous wave. The gap from the top of the wood piece to the bottom of the bell-shaped housing is 0.15". A satisfactory coating on the wood pieces was obtained.

While the present invention has been described in an illustrative manner, it should be understood that the terminology used is intended to be in a nature of words of description rather than of limitation.

Furthermore, while the present invention has been described in terms of a preferred embodiment thereof, it is to be appreciated that those skilled in the art will apply these teachings to other possible variations of the invention.

The embodiments of the invention in which an exclusive property or privilege is claimed are defined as follows:

1. A method of applying particles to a substrate comprising the steps of:

positioning an applicator over the top surface of a substrate to be coated, mixing particles with at least one inert gas in said applicator, energizing said particles with laser energy, and causing said particles to adhere to the top surface of the substrate.

2. A method according to claim 1 further comprising the step of premixing said particles with at least one inert gas in a tank prior to said mixing step in said applicator.

3. A method according to claim 1, wherein said applicator comprises an upper nozzle section and a lower bell-shaped section.

4. A method according to claim 3, wherein said upper nozzle section and said lower bell-shaped section being separated by a lens having a diameter of at least 3 in.

5. A method according to claim 3, wherein said lower bell-shaped section having an opening of at least 5" diameter.

6. A method according to claim 1, wherein said particles are liquid paint particles or solid powder coating particles.

7. A method according to claim 1, wherein said laser energy is generated from a laser selected from the group consisting of a $CO_2$, a CO, a NdYAG and an ion laser.

8. A method according to claim 1, wherein said applicator is placed in close proximity to said top surface of the substrate.

9. A method according to claim 1, wherein said applicator is placed over said top surface of the substrate at a distance of not more than 1 in.

10. A method according to claim 1, wherein said laser energy used to energize said particles has a wavelength of between about 9.5 and about 10.5 micrometers.

11. A method according to claim 1, wherein said laser energy used to energize said particles has a wavelength of about 9.8 micrometers.

12. A method according to claim 1, wherein said at least one inert gas is selected from the group consisting of helium, argon, and nitrogen.

13. A method according to claim 1, wherein said at least one inert gas is helium.

14. A method according to claim 1, wherein said particles energized by said laser energy are at least partially molten.

15. A method according to claim 1, wherein the pressure of said at least one inert gas causes said particles to adhere to the top surface of the substrate.

16. A method of coating a substrate with a power coating material comprising the steps of:

providing a substrate having a top surface to be coated, generating a laser beam from a laser source and causing said laser beam to defocus into an attenuated laser beam, mixing particles of a powder coating material with at least one inert gas forming a particles/inert gas mixture such that the particles are substantially suspended in said at least one inert gas, delivering said particles/inert gas mixture into said attenuated laser beam, and causing said particles to adhere to the top surface of said substrate.

17. A method according to claim 16, wherein said laser beam is defocused into an attenuated laser beam in a bell-shaped applicator.

18. A method according to claim 16, wherein the pressure of said at least one inert gas causes said particles to adhere to the top surface of the substrate.

19. A method according to claim 17, wherein said bell-shaped applicator having an opening for the discharge of said particles/inert gas mixture onto a substrate.

20. A method according to claim 16, wherein said laser being defocused into an attenuated laser beam by an optical lens having a diameter of at least 3".

21. A method according to claim 16, wherein said at least one inert gas is selected from the group consisting of helium, argon, and nitrogen.

22. A method according to claim 16, wherein said powder coating material is substituted by a liquid coating material.

23. A method according to claim 16, wherein said laser energy used to energize said particles has a wavelength of between about 9.5 and about 10.5 micrometers.

24. A method according to claim 16, wherein said laser energy used to energize said particles has a wavelength of about 9.8 micrometers.

25. A method according to claim 16, wherein said at least one inert gas is selected from the group consisting of helium, argon, and nitrogen.

26. A method according to claim 16, wherein said at least one inert gas is helium.

27. A method according to claim 16, wherein said particles energized by said laser energy are at least partially molten.

28. A method according to claim 16, wherein said laser source is selected from the group consisting of a $CO_2$, a CO, a NdYAG, and an ion laser.

29. A method according to claim 16, wherein said laser being defocused into an attenuated laser beam by an optical lens.

30. An apparatus for applying particles to a substrate comprising:

a laser generating device for producing a laser beam, a particle storage device capable of holding a mixture of particles and at least one inert gas, an applicator for receiving said laser beam and said mixture of particles and at least one inert gas such that laser energized particles can be delivered to a top surface of said substrate.

31. An apparatus according to claim 30, wherein said particle storage device is a fluidized bed for a powdered coating material.

32. An apparatus according to claim 30, wherein said laser generating device is selected from the group consisting of a $CO_2$, a CO, a NdYAG and an ion laser.

33. An apparatus according to claim 30, wherein said particles are liquid paint particles or solid powder coating particles.

34. An apparatus according to claim 30, wherein said at least one inert gas is selected from the group consisting of helium, argon, and nitrogen.

35. An apparatus according to claim 30, wherein said at least one inert gas is helium.

36. An apparatus according to claim 30, wherein said applicator comprises an upper nozzle section and a lower bell-shaped section.

37. An apparatus according to claim 36, wherein said upper nozzle section and said lower bell-shaped section being separated by a lens having a diameter of at least 3 in.

38. An apparatus according to claim 36, wherein said lower bell-shaped section having an opening of at least 5" diameter.

39. An apparatus according to claim 30, wherein said laser beam generated has a wavelength of between about 9.5 and about 10.5 micrometers.

40. An apparatus according to claim 30, wherein said laser beam generated has a wavelength of about 9.8 micrometers.

41. An apparatus according to claim 30, wherein said laser energized particles are at least partially molten.

42. A coating applicator comprising:

an upper chamber adapted to receive a laser beam, a lower chamber adapted to receive coating particles suspended in at least one inert gas at near a bottom opening of said chamber, an optical lens situated in between said upper chamber and said lower chamber for providing optical communication between said chambers, said optical lens defocuses said laser beam into a beam of larger diameter at said opening of said lower chamber to energize said coating particles.

43. A coating applicator according to claim 42, wherein said coating particles being energized by said laser into an at least partially molten state.

44. A coating applicator according to claim 43, wherein said lower chamber is a bell-shaped chamber having a bottom opening.

45. A coating applicator according to claim 42, wherein said laser beam is generated from a source selected from the group consisting of a $CO_2$, a CO, a NdYAG and an ion laser.

46. A coating applicator according to claim 42, wherein said at least one inert gas is selected from the group consisting of helium, argon, and nitrogen.

47. A coating applicator according to claim 42, wherein said coating particles after being energized exit the bottom opening of said applicator to adhere to a surface of a substrate.

48. A coating applicator according to claim 44, wherein said bottom opening of said applicator is positioned in close proximity to the surface of said substrate.

49. A coating applicator according to claim 42, wherein said coating particles are powders or liquid particles.

50. A coating applicator according to claim 42, wherein said laser beam has a wavelength of between about 9.5 and about 10.5 micrometers.

51. A coating applicator according to claim 42, wherein said laser beam has a wavelength of about 9.8 micrometers.

52. A coating applicator according to claim 42, wherein said at least one inert gas is helium.

* * * * *